United States Patent
Minemoto

(10) Patent No.: US 6,912,080 B2
(45) Date of Patent: Jun. 28, 2005

(54) MAGNETO-OPTIC MODULATOR AND OPTICAL COMMUNICATION SYSTEM USING THE SAME

(75) Inventor: Hisashi Minemoto, Otsu (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/391,793

(22) Filed: Mar. 20, 2003

(65) Prior Publication Data

US 2003/0184841 A1 Oct. 2, 2003

(30) Foreign Application Priority Data

Mar. 26, 2002 (JP) .................................... 2002-085240

(51) Int. Cl.[7] .............................................. G02F 1/09
(52) U.S. Cl. ................................ 359/283; 359/281
(58) Field of Search ........................... 359/280, 281, 359/283, 284, 288

(56) References Cited

U.S. PATENT DOCUMENTS

| | | | |
|---|---|---|---|
| 5,657,151 A | 8/1997 | Swan et al. | 359/281 |
| 6,141,140 A | 10/2000 | Kim | 359/281 |
| 6,542,647 B2 * | 4/2003 | Minemoto et al. | 385/6 |
| 6,661,560 B1 * | 12/2003 | Sobolewski | 359/283 |

FOREIGN PATENT DOCUMENTS

| | | |
|---|---|---|
| EP | 0 627 613 A | 12/1994 |
| EP | 1 202 105 A | 5/2002 |
| JP | 4-172261 | 6/1992 |
| JP | 7-199137 | 8/1995 |
| JP | 10-186189 | 7/1998 |
| JP | 2001-272639 | 10/2001 |

OTHER PUBLICATIONS

J. Appl. Phys. vol. 76 No. 3 pp. 1405–1408 (1994), "Estimation of direct current bias and drift of Ti:LiNbO$_3$ optical modulators".
J. Appl. Phys. vol. 53 No. 11 pp. 8263–8265 (1982), "A sensitive and compact magnetometer using Faraday effect in YIG waveguide".
National Technical Report vol. 38 No. 2 pp. 127–133 (1992), "Fiber–Optic Monitoring Sensor System for Power Distribution Lines".
Appl. Phys. Lett. vol. 68 No. 25 pp. 3546–3548 (1996), "Ultrafast magneto–optic sampling of picosecond current pulses".

* cited by examiner

Primary Examiner—Georgia Epps
Assistant Examiner—William Choi
(74) Attorney, Agent, or Firm—Louis Woo

(57) ABSTRACT

The magneto-optic modulator rotates a polarization of a light incident to a magneto-optic device which causes Faraday effect under such a magnetic field arrangement that the RF magnetic field has a component perpendicular to a light propagation direction and the RF magnetic field is directed to more than ±30° from the bias magnetic field direction. The bias magnetic field generator may be a permanent magnet, while the RF magnetic field generator may be a strip line running along a waveguide for the incident light. The strip line is fed by an RF electric current signal. The light beam is modulated at a frequency as high as about 10 GHz. The modulation depth can be further improved by using an impedance transformer and magnetic core.

40 Claims, 16 Drawing Sheets

MAGNETO-OPTIC MODULATOR AND OPTICAL COMMUNICATION SYSTEM USING THE SAME

BACKGROUND OF THE INVENTION

1. Field of the Invention

The present invention relates to a magneto-optic modulator and an optical communication system using the same.

2. Description of the Related Art

An electro-optic modulator such as a Pockels cell has been widely employed in conventional optical communication systems. Particularly, a wave-guide optical modulator utilizing an electro-optic effect of the $LiNbO_3$ crystal is a typical one (Nishihara et al., Optical Integrated Circuit, pp298–304, 1985, Ohm-sha). However, the optical modulator using the electro-optic crystal has a disadvantage that it suffers from the DC drift (J. Appl. Phys. Vol. 76 No. 3 pp1405–1408 (1994)) and optical damage. Therefore, it is difficult to operate it stably for a long time period, or it costs much to avoid a deterioration in its characteristics.

Recently, there have been disclosed various optical communication systems wherein an electric field from an antenna as a source of radio frequency signal is applied to the electro-optic modulator (JP4-1722611A, JP10-186189 A).

On the other hand, although a magneto-optic modulator has been studied for a long time, development thereof is not being well advanced, due to its response speed slower than that of the electro-optic modulator.

Therefore, the magneto-optic modulator is applied, due to the slow response speed, only to a magnetic field sensor or electric current sensor which operates at a low response speed (J. Appl. Pyhs. Vol. 53 No.11 pp.8263–8265 (1982), National Technical Report Vol. 38 No. 2, pp. 127–133 (1992)).

The conventional magneto-optic modulator employed in an optical communication system disclosed in JP7-199137A responds to no higher than several tens kHz. Further, an optical isolator is used for a magneto-optic modulator in U.S. Pat. No. 6,141,140. However, the response speed thereof is also low and one of the disadvantages thereof is that it does not operate as the optical isolator, due to a light unnecessarily reflected-back toward a light source under the presence of Faraday effect.

Further, a magneto-optic modulator wherein a DC bias magnetic field is applied to a magneto-optic crystal film has been recently studied in order to measure an electric current in a semiconductor electronic circuit substrate (Appl. Phys. Lett. Vol. 68, No. 25 pp. 3546–3548 (1996), 61th JJAP Transaction, lecture No. 4p-Q-4 (2000)).

As described above, the electro-optic modulator, particularly the wave-guide optical modulator using the Pockels effect has advantages that it is suitable for a high speed modulation of a laser or LED light and that it is free from a wave-length variation or wave-length chirping which is caused by a direct modulation of a semiconductor laser. However, the electro-optic modulator has a disadvantage that it has a DC drift and optical damage which increase a production cost in order to countermeasure against the disadvantage. Further, the DC drift and temperature characteristics are of great concerns in the optical communication system wherein the light is modulated by the electric signal from the antenna in the optical modulator disposed outdoors.

Further, there is a magneto-optic modulator for monitoring an electric current wave form on a micro strip line, by disposing the magneto-optic crystal directly on a semiconductor substrate or micro strip line and by applying a DC bias magnetic field to the magneto-optic crystal (Appl. Phys. Lett. Vol. 68 No. 25 pp. 3546–3548 1996). However, the above-mentioned current monitoring has a disadvantage that the current wave form is distorted by a ringing due to an impedance mismatching between the line and modulation signal generator. Further, the above-mentioned current monitoring device does not include any optical fiber and therefore, is not suitable for the optical communication systems. On the other hand, another magneto-optic modulator for monitoring the current wave form on the micro strip line wherein an analyzer is disposed after passing a short, e.g., shorter than about 1 m, optical fiber (61st JJAP Transaction, Lecture No. 4p-Q-4 (2000)). However, a linear polarization becomes in general a random polarization through a long optical fiber. Therefore, the intensity modulation of light propagating through a long optical fiber can not be achieved even by using the analyzer. Further, in the above-mentioned another magneto-optic modulator, the DC bias magnetic field is almost parallel to the radio frequency magnetic field. Therefore, the above-mentioned another magneto-optic modulator has a disadvantage that the magneto-optic modulator is magnetically saturated under a large bias magnetic field for obtaining a single magnetic domain and the magnetic saturation greatly reduces or completely extinguishes the modulated signal.

It is true that there are being used in almost all of the conventional optical communication system a direct high speed modulation of the electric current in the semiconductor laser and a wave-guide optical modulator utilizing the electro-optic effect (Pockels effect). Although the direct modulation of the semiconductor laser has an advantage that the optical communication system does not need any modulator and therefore, its structure becomes simple, the modulation frequency is no higher than several GHz and driving circuit becomes highly advanced and a transmission distance through the optical fiber of the optical signal is limited by the wavelength chirping due to the high speed direct modulation which causes group velocity delay differences depending the chirped wavelengths, thereby distorting a signal propagating the long optical fiber.

SUMMARY OF THE INVENTION

An object of the present invention is to provide a magneto-optic modulator which operates in a wider frequency range and is free from the disadvantages of the electro-optic modulator such as the DC drift and optical damage.

The magneto-optic modulator of the present invention is characterized in that a bias magnetic field is directed almost along the light propagation direction, while the RF magnetic field is directed to a direction different from the light propagation direction. Further, the present invention is characterized in that the RF magnetic field is generated by a magnetic field induced by an RF electric current signal transmitting on a distributed constant line such as a strip line (including micro strip line), coplanar line, or coaxial line.

Hereinafter, the term "strip line" shall always include micro strip line.

The magneto-optic modulator of the present invention comprises: a magneto-optic device for rotating a polarization of an incident light; a bias magnetic field generator for generating a bias magnetic field; an RF magnetic field generator for generating an RF magnetic field; and an impedance adjuster for adjusting an impedance of the RF magnetic field generator, wherein the RF magnetic field has a component perpendicular to a light propagation direction; and the RF magnetic field is directed to more than ±30° from the bias magnetic field direction.

Here, the bias magnetic field may be directed to the light propagation direction, while the RF magnetic field is directed to 90° from the light propagation direction.

Further, the bias magnetic field may be directed to 45° from the light propagation direction, while the RF magnetic field is directed to 90° from the light propagation direction.

Further, the bias magnetic field may be directed to 45° from the light propagation direction, while the RF magnetic field is directed to 135° from the light propagation direction.

The above-mentioned magneto-optic modulator is utilized in the optical communication system of the present invention. Here, the RF signal from an antenna may be fed to the RF magnetic field generator such as a strip line, coplanar line, or coaxial line.

Concretely, the optical communication system of the present invention comprises: the magneto-optic modulator of the present invention; a light source for inputting a light into the magneto-optic modulator; a photo detector for detecting the light modulated by the magneto-optic modulator; and optical fibers from the light source to the magneto-optic modulator and from the magneto-optic modulator to the photo detector.

According to the present invention, the magneto-optic modulator can operates at a higher frequency up to nearly a ferromagnetic resonance frequency, because a strip line, coplanar, or coaxial line along the light propagation direction is used as a RF magnetic field generator together with a bias magnetic field directed toward a direction different from that of the RF magnetic field.

Further, according to the present invention, the modulation becomes deep with a good linearity regarding the RF magnetic field.

Further, according to the present invention, there is not any DC drift which is a disadvantage of the electro-optic modulator.

Furthermore, according to the present invention, an RF signal from an antenna can be fed to an RF magnetic field generator, thereby constructing an optical communication system for wireless RF signals.

PREFERRED EMBODIMENTS OF THE INVENTION

Figure 1A:
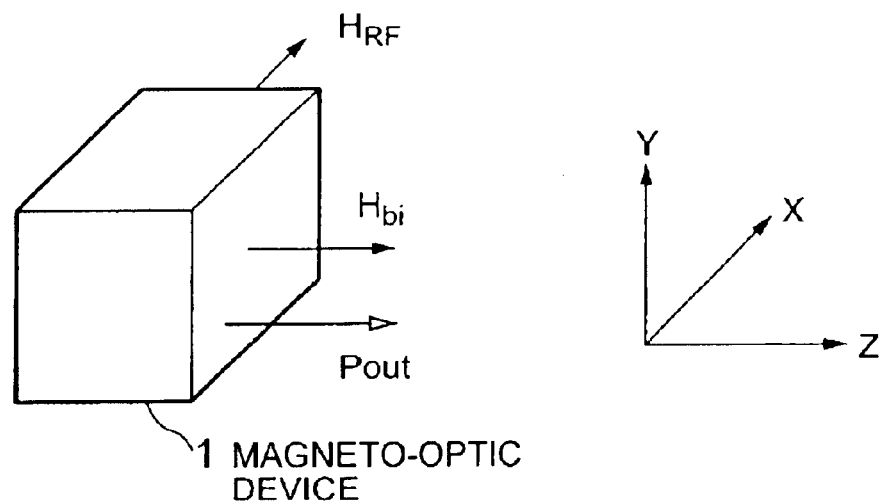
FIGS. 1A and 1B show a magnetic field direction and light propagation direction in a magneto-optic modulator of the present invention.

Magnetic field arrangements in the magneto-optic modulator of the present invention are explained, referring to the drawings.

Figure 15:
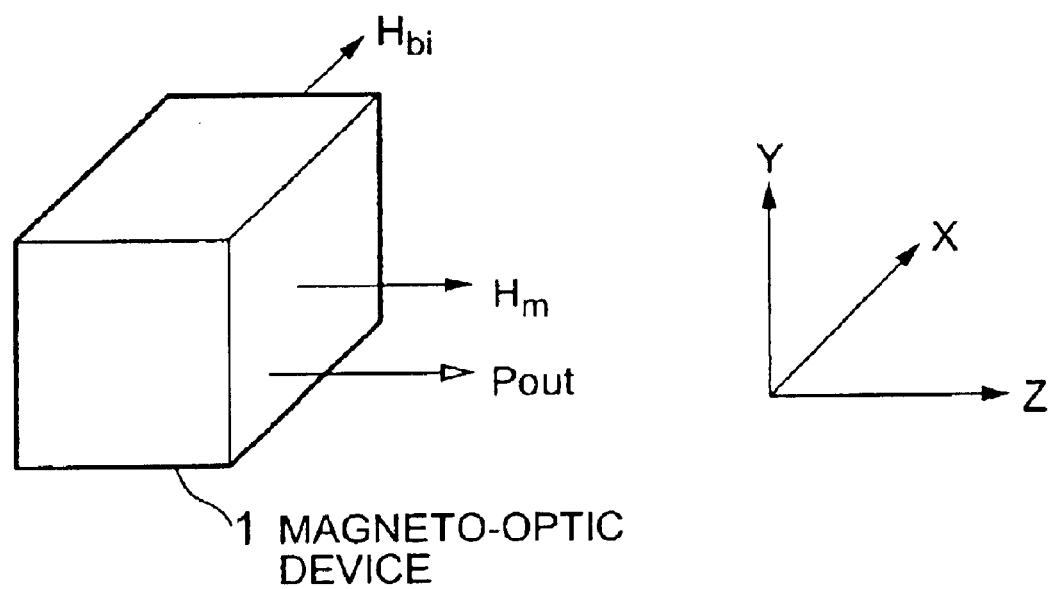
FIG. 15 is a perspective view of a conventional magneto-optic device, showing a magnetic field direction and light propagation direction.

First, FIG. 15 shows a relationship of a magnetic field direction and light propagation direction in a conventional magneto-optic modulator. Faraday effect is determined by a magnetization component of a ferromagnetic material (including a ferrimagnetic material such as garnet) parallel to the light propagation direction. Therefore, the modulation magnetic field Hm is applied along the light propagation direction Pout (the Z direction) in order to efficiently obtain a large Faraday effect. Further, the bias magnetic field Hbi perpendicular to Hm is applied along the X direction) in order to arrange multiple domain structure into a single domain, thereby removing a slow (usually between 100 MHz and several hundreds MHz) resonance due to the multiple domain structure. Under those magnetic field arrangement, the magnetization of the magneto-optic material is directed to a direction of a vector sum of Hm and Hbi, neglecting a magnetic anisotropy and demagnetization field. Further, Faraday rotation angle is determined by a magnetization component parallel to Pout (the Z direction). However, it is difficult to effectively apply Hm along the Z direction, when distributed constant circuits such as a strip line, coplanar line and coaxial line are used. Therefore, it is difficult to effectively generate the RF magnetic field along Pout. Further, it is difficult to operate the magneto-optic modulator in a wider frequency range, when a coil is used and a number of turns thereof is increased.

On the contrary, FIG. 1A is a perspective view of one of the magnetic field arrangements employed in the present invention showing the (0°, 90°) arrangement, wherein the bias field Hbi is directed to the light propagation direction Pout (0° from the Z direction), while the RF magnetic field $H_{RF}$ is perpendicular to the light propagation direction (along the X direction, i.e., 90° from the Z direction). It becomes possible to magnetize the entire length of the strip line (including micro strip line), or coplanar line, because the RF magnetic field is perpendicular to Pout.

Figure 1B:
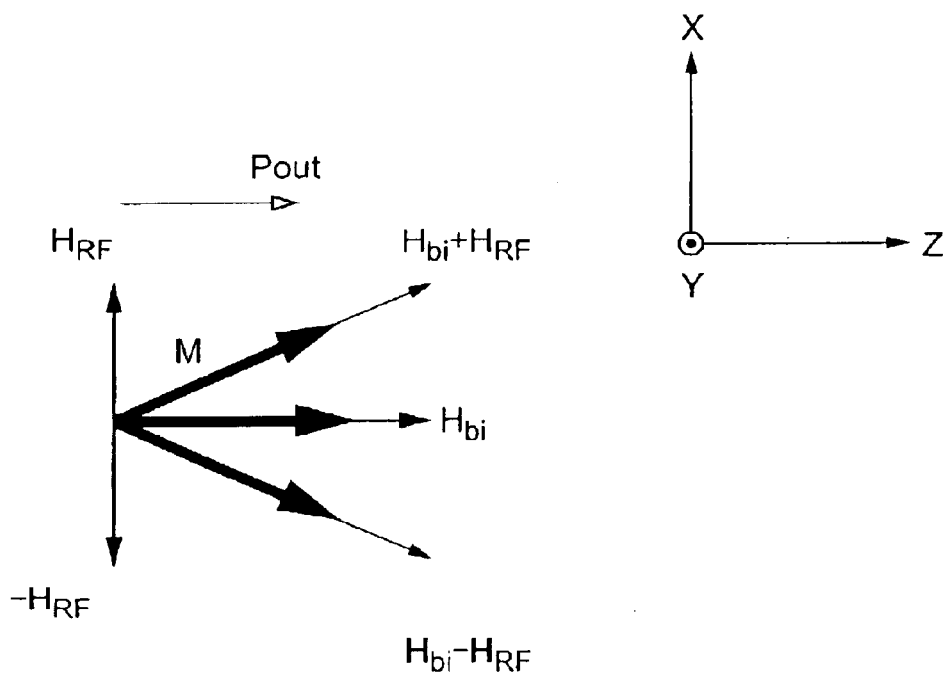

FIG. 1B shows a vector sum of Hbi and $H_{RF}$ in the (0°, 90°) arrangement. Although $H_{RF}$ is perpendicular to Hbi and Pout in FIGS. 1A and 1B, $H_{RF}$ and Hbi may be within a range of about ±30°, respectively, in a practical use. Further, $H_{RF}$ may be directed in the Y direction. Further, Hbi is not limited to a DC magnetic field, but may be an AC magnetic field of which frequency is sufficiently lower than the RF frequency, e.g., 1/10, preferably 1/100, or more preferably 1/1000 times the RF frequency. Further, Hbi may includes a RF ripple component on the DC component.

The magnetization vector M is directed to the vector sum (Hbi+$H_{RF}$) or (Hbi–$H_{RF}$), neglecting a magnetic anisotropy and demagnetization field and the Z component of M is proportional to Faraday rotation of the magneto-optic modulator. Here, M is saturated. Therefore, its norm is constant and is directed to a vector sum of Hbi and $H_{RF}$.

Figure 2A:
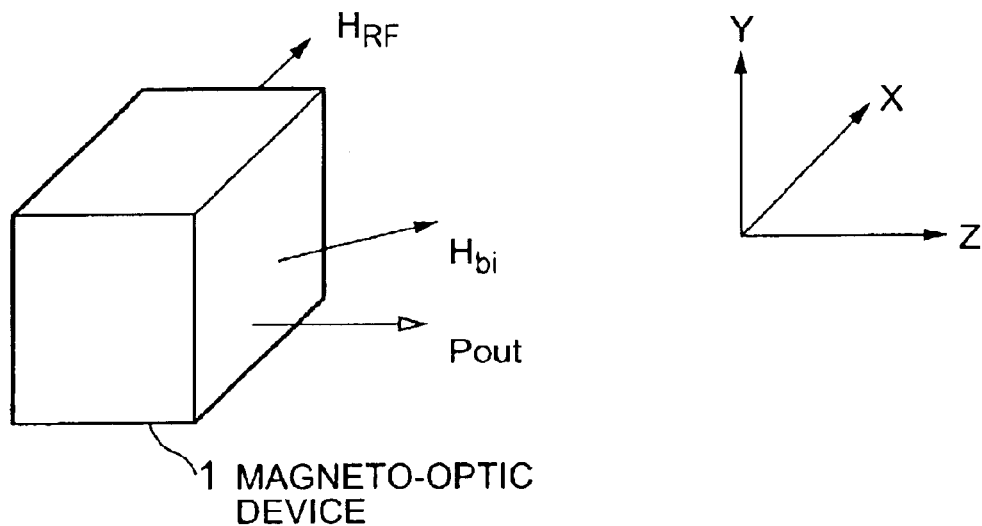
FIGS. 2A and 2B show a magnetic field direction and light propagation direction in another magneto-optic modulator of the present invention.

Further, FIG. 2A is a perspective view showing the (45°, 90°) arrangement, wherein Hbi is directed to 45° from the Z direction, while $H_{RF}$ is directed 90° from the Z direction). It becomes possible to magnetize the entire length of the strip or coplanar line, or coaxial line, because $H_{RF}$ is perpendicular to the light propagation direction.

Figure 2B:
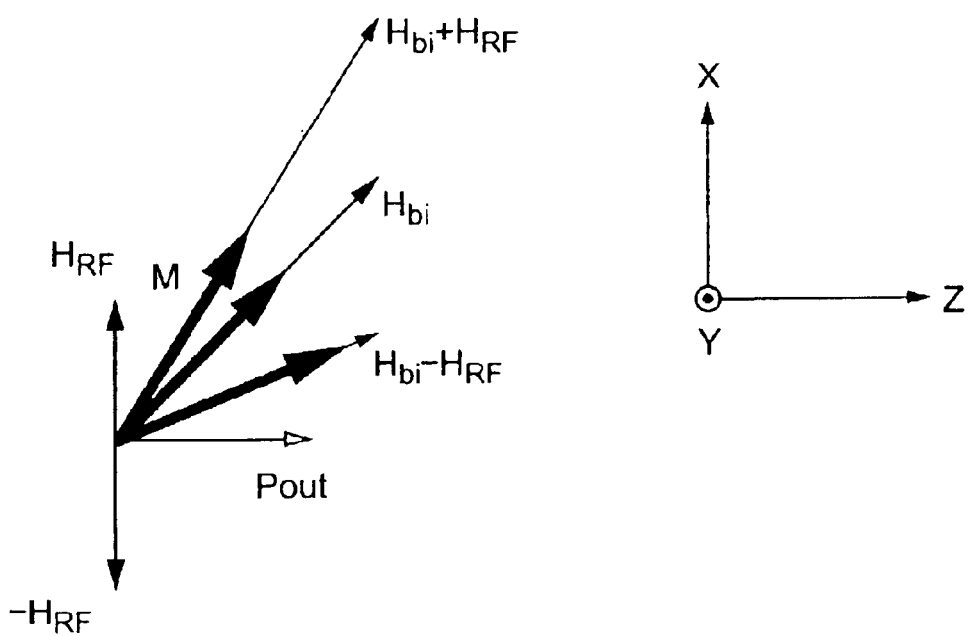

FIG. 2B shows a vector sum of Hbi and $H_{RF}$ in the (45°, 90°) arrangement as shown in FIG. 2A. The Z component of M greatly changes in the $H_{RF}$ of which norm is the same as in FIG. 1B.

Figure 3A:
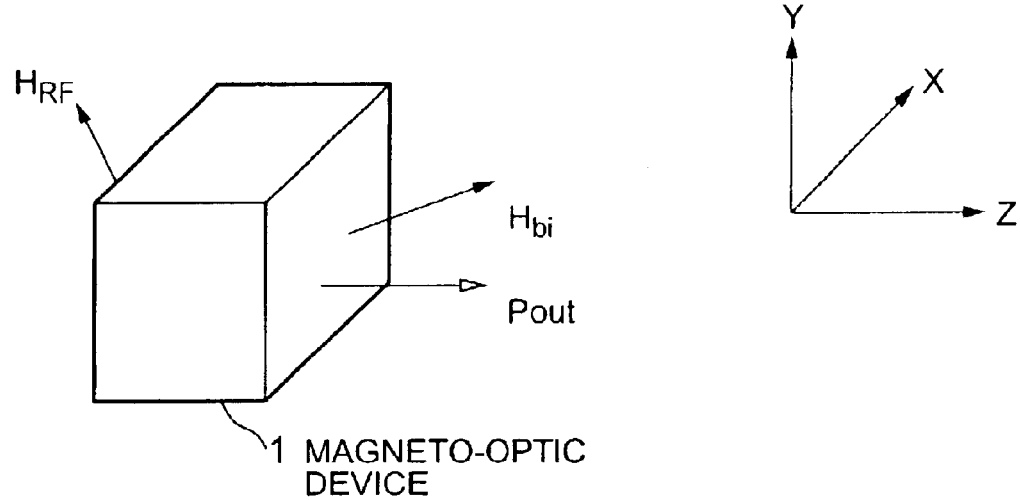
FIGS. 3A and 3B show a magnetic field direction and light propagation direction in other magneto-optic modulator of the present invention.

Further, FIG. 3A is a perspective view showing the (45°, 135°) arrangement, wherein Hbi is directed to 45° from the Z direction, while $H_{RF}$ is directed 135° from the Z direction. The Z component of M greatly changes in $H_{RF}$ of which norm is the same as in FIG. 1B. Further, the vector M changes symmetrically around the vector Hbi.

Figure 3B:
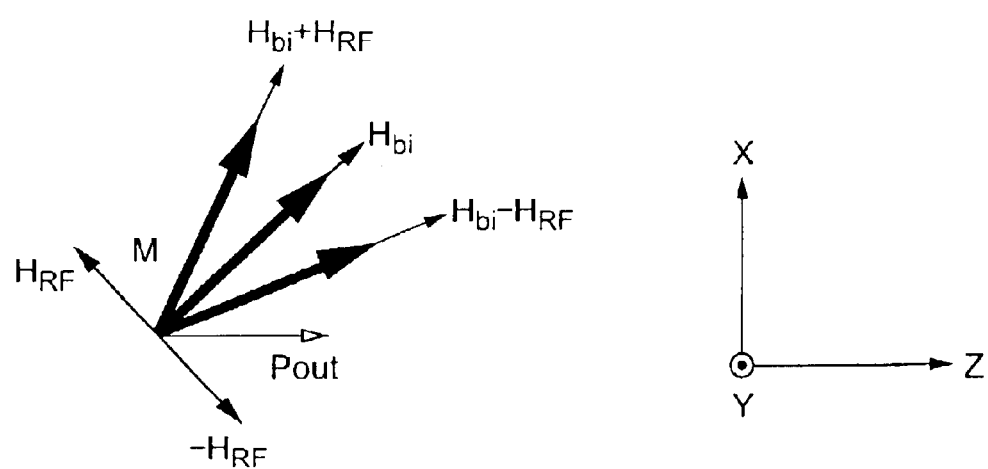

FIG. 3B shows a vector sum of Hbi and $H_{RF}$ in the (45°, 135°) arrangement as shown in FIG. 3A. The Z component of M greatly changes in $H_{RF}$ of which norm is the same as in FIG. 1B. Further, the vector M changes symmetrically around the vector Hbi.

Figure 4:
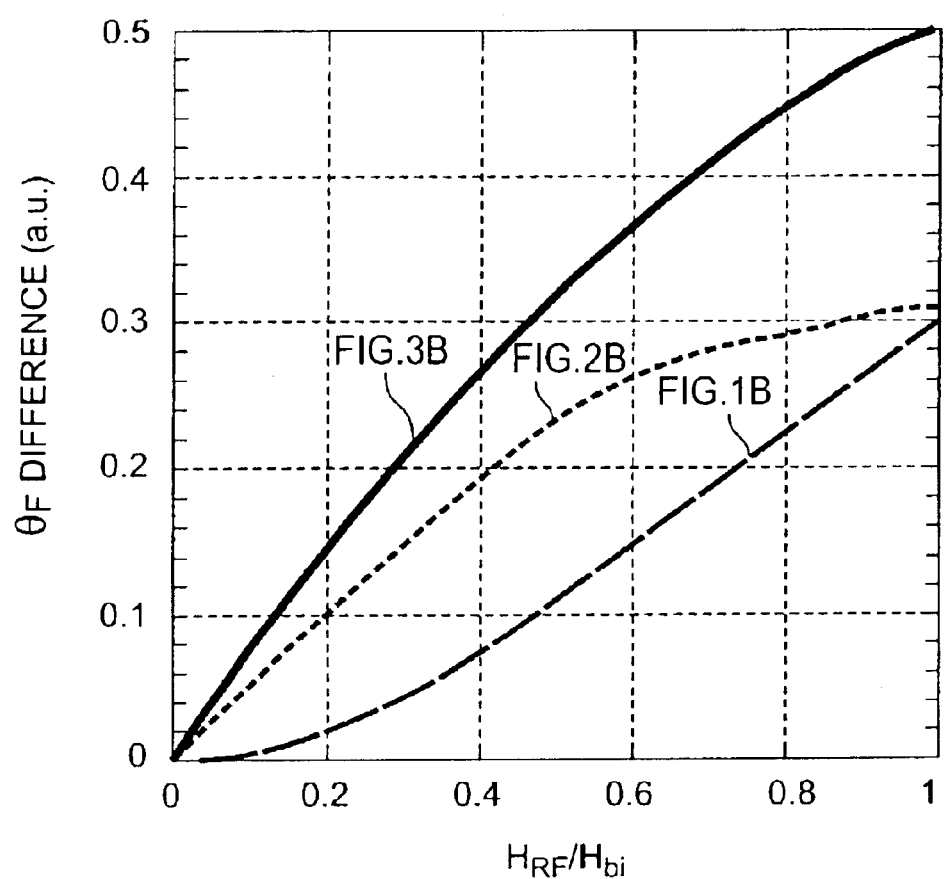
FIG. 4 is a graph showing calculated differences in Faraday rotation angle $\theta_F$ per unit interaction length of the light and magnetic fields for the magnetic field arrangement as shown in FIGS. 1B, 2B and 3B. The $\theta_F$ difference is defined by an absolute value of a difference between $\theta_F$ under non-zero $H_{RF}$ and $\theta_F$ under zero $H_{RF}$

FIG. 4 is a graph showing calculated differences in Faraday rotation angle $\theta_F$ per unit interaction length of the light and magnetic fields for the magnetic field arrangement as shown in FIGS. 1B, 2B and 3B. The $\theta_F$ difference is defined by an absolute value of a difference between $\theta_F$ under non-zero $H_{RF}$ and $\theta_F$ under zero $H_{RF}$.

In the (0°, 90°) arrangement as shown in FIG. 1B, $\theta_F$ difference is small.

In the (45°, 90°) arrangement as shown in FIG. 2B, $\theta_F$ difference to the ratio $H_{RF}$/Hbi is relatively large.

In the (45°, 90°) arrangement as shown in FIG. 3B, $\theta_F$ difference is the largest and distortionless in a wider range of the ratio $H_{RF}$/Hbi.

Although Hbi or $H_{RF}$ are directed to 0°, 45°, 90°, or 135°, it may be deviated within about 30° from the designated directions, taking an indefinite magnetic anisotropy.

Embodiment 1

Figure 5:
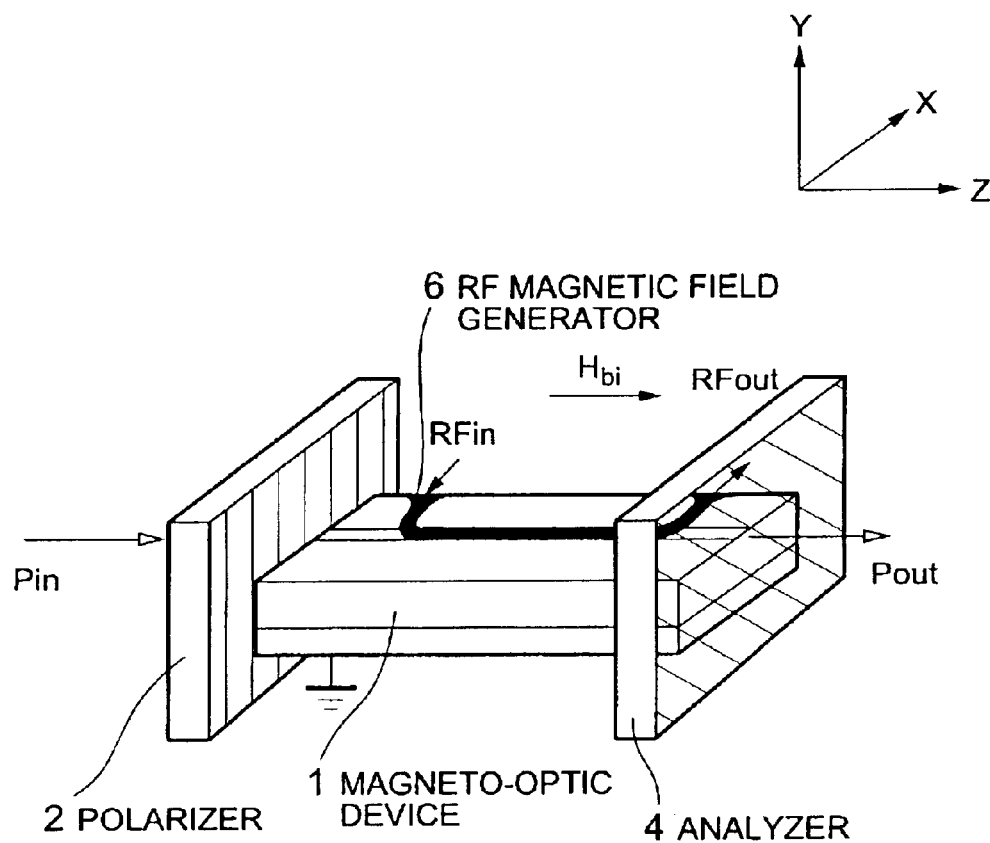
FIG. 5 is a perspective view of the magneto-optic modulator of Embodiment 1 of the present invention, utilizing the magnetic field arrangement as shown in FIG. 1B.

FIG. 5 is a perspective view of the magneto-optic modulator of Embodiment 1 of the present invention, wherein the magnetic field arrangement is (0°, 90°) as shown in FIG. 1B. Magnetic field generator (not shown) for Hbi directed to Pout (the Z axis) may be an electromagnet or permanent magnet such as SmCo. The magneto-optic device 1 may be any ferromagnetic material having Faraday effect such as YIG ($Y_3Fe_5O_{12}$) or Bi-substituted rare earth iron garnet. In order to form a wave-guide, for example, a crystal film of Bi-substituted rare earth iron garnet on a $Gd_3Ga_5O_{12}$ (GGG) or Ca—Mg—Zr substituted GGG substrate is etched, thereby forming a messa and an insulating layer is deposited on the messa. Further, a waveguide may be formed by a $SiO_2$ stripe directly on the magneto-optic crystal film, without etching.

A strip line is used for the RF magnetic field generator 6 for generating $H_{RF}$ along the X axis. Further, the substrate is grounded. An RF signal is inputted into the strip line which is ended by a not shown terminator such as a terminal resistor.

The light beam Pin is linearly polarized by the polarizer 2 and its polarization is rotated by Faraday effect during propagating through the magneto-optic waveguide in which Hbi and $H_{RF}$ are applied. Here, $H_{RF}$ is a magnetic field induced by the RF signal inputted into the strip line 6. Thus, the modulated light is outputted through the analyzer 4. Since the RF signal propagates in the strip line on the insulating layer above the magneto-optic waveguide, the waveguide is efficiently magnetized by the RF magnetic field of the RF signal. The impedance of the strip line 6, a not-shown terminator and not-shown RF signal generator is adjusted for a wider bandwidth operation. The incident light Pin was modulated by the magneto-optic modulator of Embodiment from DC to 10 GHz.

If Faraday rotation angle is 90°, the modulation depth is the greatest for the analyzer axis $P_A$ is 45° from the polarizer axis $P_P$. Further, if Faraday rotation angle is not 90° in general, the angle of the analyzer axis $P_A$ from the polarizer axis $P_P$ is adjusted in such a direction that a half intensity of the modulated light outputting the magneto-optic modulator is transmitted through the analyzer 2 in order to obtain a maximum modulaltion depth.

Further, the RF magnetic field generator 6 may be a coplanar line.

Further, the polarizer 2 may be omitted, if the incident light is linearly polarized.

Embodiment 2

Figure 6:
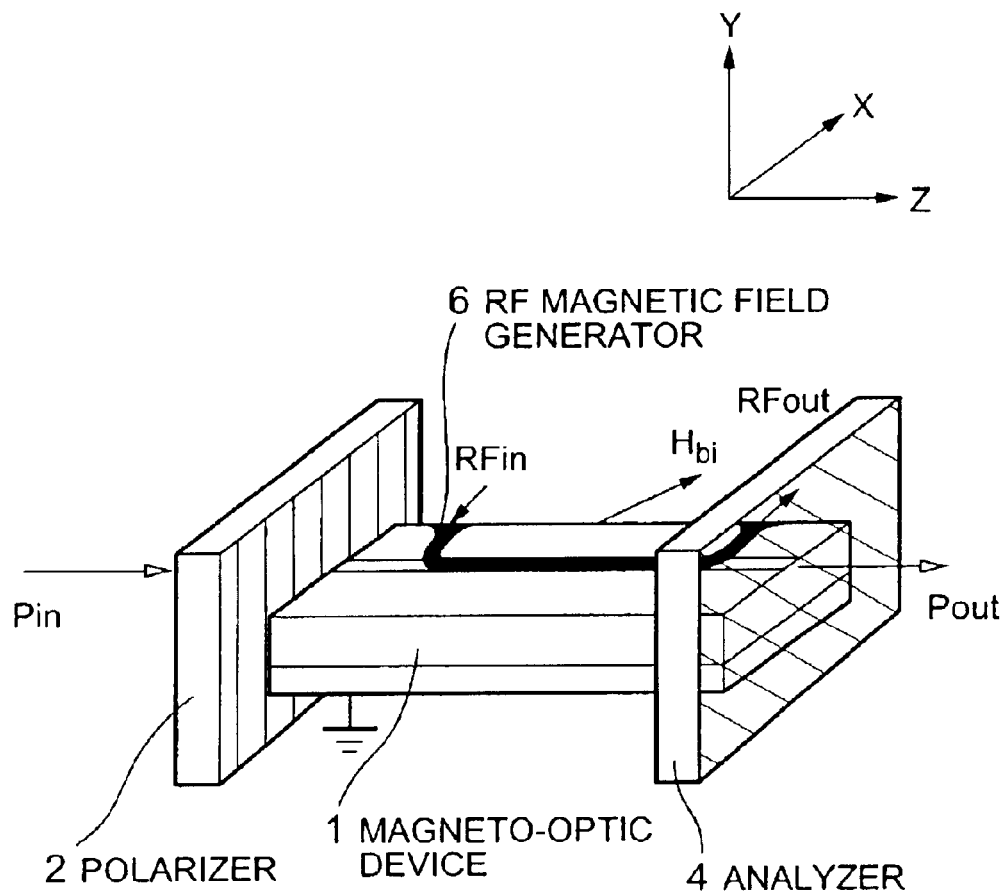
FIG. 6 is a perspective view of the magneto-optic modulator of Embodiment 2, utilizing the magnetic field arrangement as shown in FIG. 2B.

FIG. 6 is a perspective view of the magneto-optic modulator of Embodiment 2 of the present invention, wherein the magnetic fields arrangement is (45°, 90°) as shown in FIG. 2B. Further, the analyzer 4 is fixed at such a direction α that a half of the modulated light intensity is transmitted through the analyzer 4 in order to obtain the maximum modulation signal. As for the others, Embodiment 2 is the same as Embodiment 1. Further, the terminator, i.e., a part of the impedance adjuster for the RF signal is omitted.

The incident light Pin was modulated by the magneto-optic modulator of Embodiment 2 from DC to 10 GHz, and the modulated signal intensity is several times the intensity in Embodiment 1, under the same RF signal power.

Embodiment 3

Figure 7:
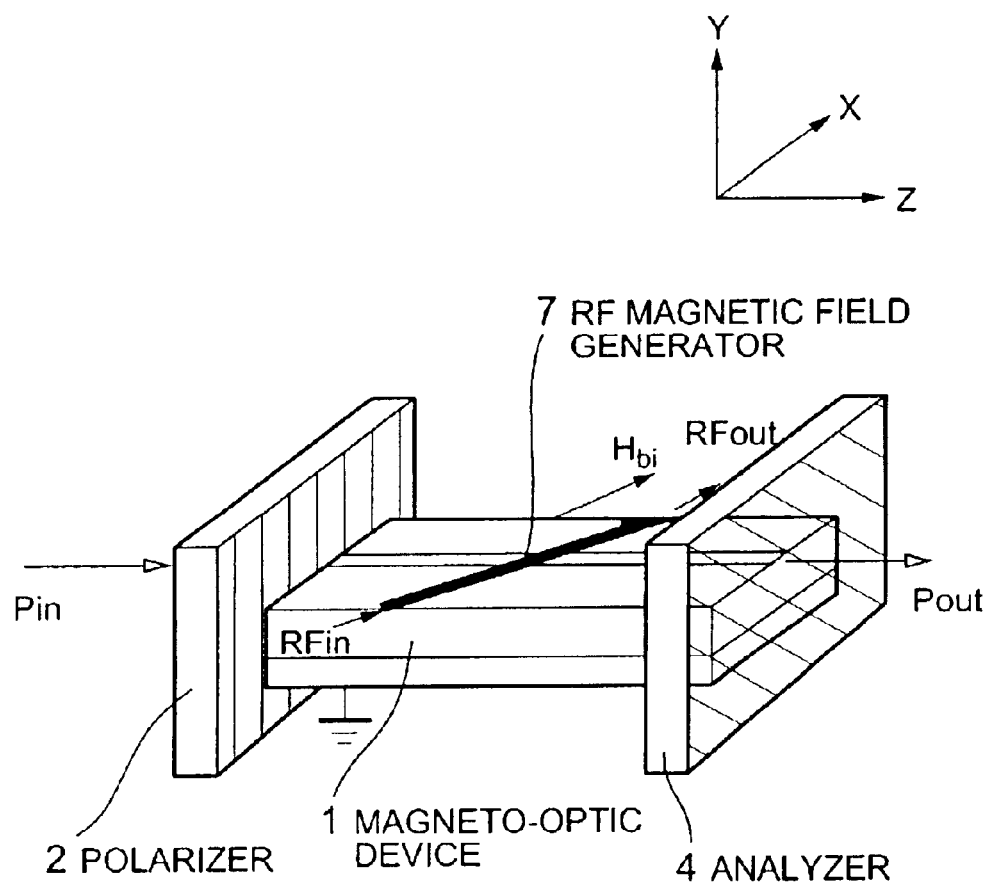
FIG. 7 is a perspective view of the magneto-optic modulator of Embodiment 3, utilizing the magnetic field arrangement as shown in FIG. 3B.

FIG. 7 is a perspective view of the magneto-optic modulator of Embodiment 3 of the present invention, wherein the magnetic fields arrangement is (45°, 135°) as shown in FIG. 3B. Further, the strip line is directed to 45° from the Z axis in the XZ plane, thereby directing $H_{RF}$ to 135° from the Z axis. As for the others including the analyzer angle, Embodiment 3 is the same as Embodiment 2. Further, the terminator, i.e., a part of the impedance adjuster for the RF signal is not shown.

The incident light was modulated by the magneto-optic modulator of Embodiment 3 from DC to 10 GHz, and with a linearity regarding $H_{RF}$ better than in Embodiments 1 and 2.

Embodiment 4

Figure 8:
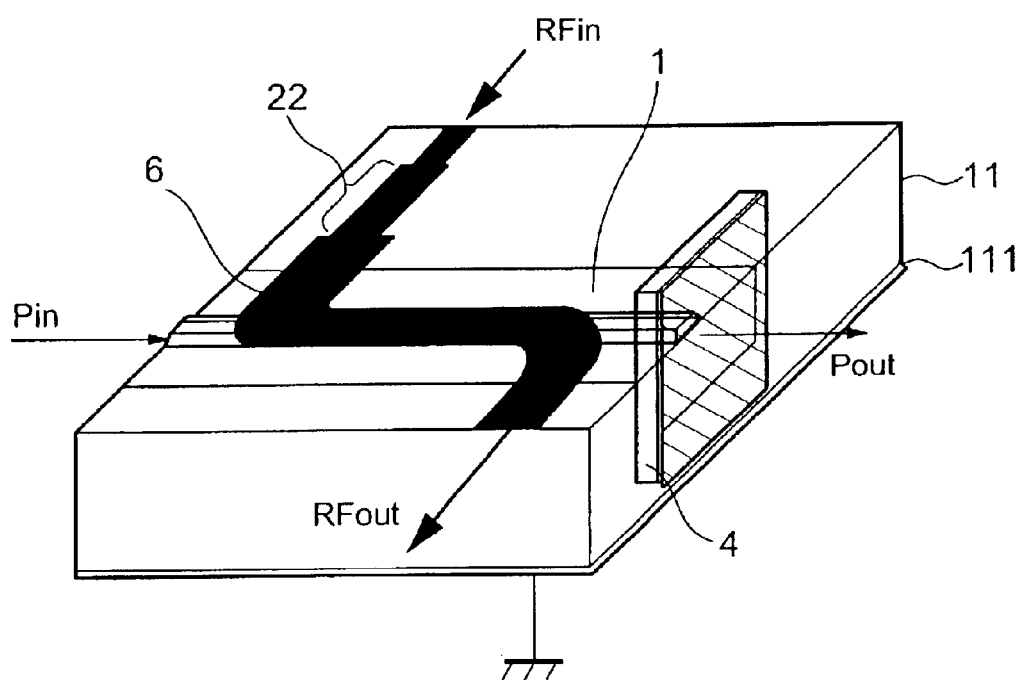
FIG. 8 is a perspective view of the magneto-optic modulator of Embodiment 4.

FIG. 8 is a perspective view of a main part of the magneto-optic device 1 including an impedance transformer of Embodiment 4. The magneto-optic device 1 is buried in a groove in an insulating substrate 11 such as alumina, resin, e.g., teflon. Further, the insulating substrate 11 is electrically grounded by the electrode 111, in accordance with the micro strip line structure. Further, The linearly polarized semiconductor laser beam is used and therefore, the polalizer is omitted The characteristic impedance of RF signal lines, RF connectors is designed to become, in general, 50 or 75 ohms which should be matched with the RF signal generator. On the other hand, the magneto-optic modulator is driven by an electric current and therefore it is more advantageous to increase the electric current by lowering the impedance down to lower than 50 or 75 ohms, e.g., greater than or equal to 5 ohms and smaller than or equal to 45 ohms. This is because the electric current is not so much increased by the impedance a little lower than 50 ohms, while the signal ringing is caused by a small deviation of the impedance under too much low impedance.

The $\lambda/4$ transformer 22 is formed as a part of the impedance transformer is formed as a part of the strip line included in the magneto-optic device 1 of which magnetic field arrangement may be the (0°, 90°) arrangement as shown in FIG. 1B, or the (45°, 90°) as shown in FIG. 2B. Here, for example, the line input impedance is 50 ohms, while the line output impedance is 25 ohms, thereby designing the impedance of the $\lambda/4$ transformer 22 to become $(50 \cdot 25)^{1/2}$ ohms= 35 ohms.

Thus, the line impedance after the $\lambda/4$ transformer 22 as well as the output impedance is 25 ohms.

According to the $\lambda/4$ transformer 22, the modulation depth, i.e., the modulation signal intensity became about twice the intensity, under the same RF signal input.

The wavelength $\lambda/4$ of the RF signal corresponds to a desired modulation frequency. When 5 GHz corresponding to $\lambda/4$ was selected, the actual modulation frequency was DC to 10 GHz with a little ripple within this frequency range. Here, the upper limit of the actual modulation frequency depends upon measuring instruments. Further, the ripple is reduced by using a taper matching transformer instead of the $\lambda/4$ transformer 22.

Embodiment 5

Figure 9:
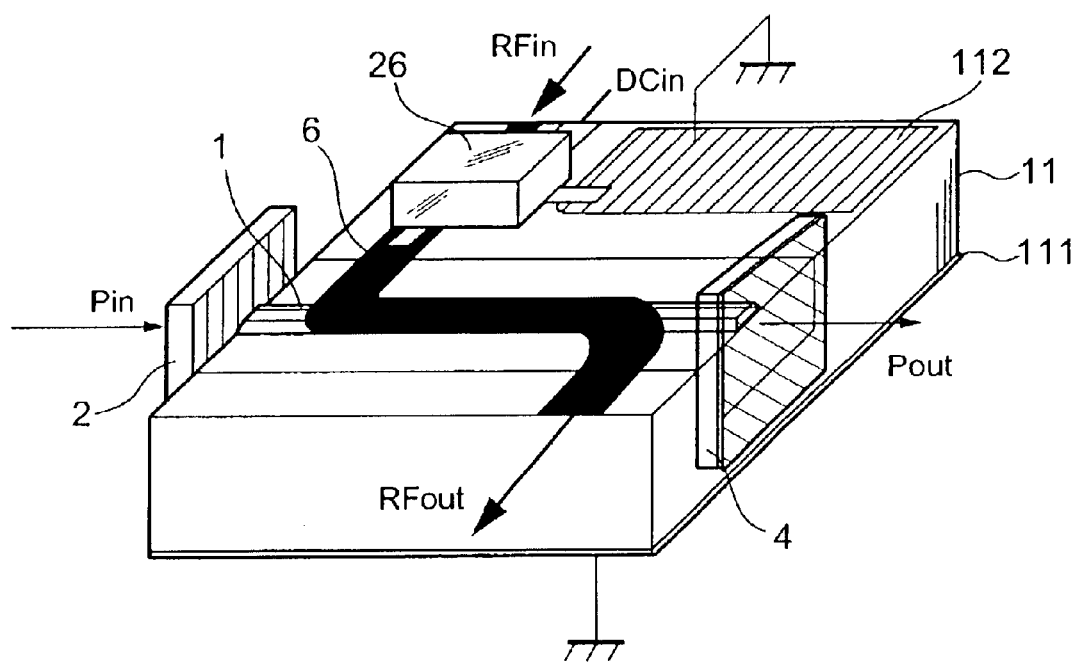
FIG. 9 is a perspective view of the magneto-optic modulator of Embodiment 5.

FIG. 9 is a perspective view of a main part of the magneto-optic device 1 including a driving circuit as an impedance transformer of Embodiment 5. The magneto-optic device 1 is buried in a groove in an insulating substrate 11 such as alumina, resin, e.g., teflon. Further, the magnetic field arrangement may be the (0°, 90°) arrangement as shown in FIG. 1B, or the (45°, 90°) as shown in FIG. 2B. Further, the driving circuit 26 is grounded by the electrode 112, while the insulating substrate 11 is grounded by the electrode 111 in accordance with the strip line structure.

The conventional electro-optic modulator is driven by a voltage, i.e., an electric field which changes a reflectivity of the electro-optic material such as $LiNbO_3$. Therefore, the driving circuit for the electro-optic modulator is a voltage amplifier of which output impedance is held at 50 or 75 ohms. On the other hand, the magneto-optic modulator is driven by an electric current and therefore, it is advantageous to apply an increased electric current to the magneto-optic modulator in order to raise the modulation depth.

Although a conventional electric power amplifier can be employed for the driving circuit, the driving circuit for the magneto-optic modulator is preferably an electric current amplifier such as an emitter follower wherein a load is connected with an emitter of a transistor, thereby extinguishing Mirror effect of the transistor and as a result driving the magneto-optic modulator up to a higher frequency.

For example, the driving circuit 26 of which output circuit is mainly the emitter follower may be designed in such a manner that an electric current amplification factor is tenfold and the output impedance is 5 ohms. Further, the impedance of the strip line. i.e., the RF magnetic field generator 6 and the not-shown terminator may be designed to become 5 ohms. The tenfold electric current can thus raise modulation depth up to tenfold.

It is experimentally confirmed that the tenfold modulation depth was obtained by using the 5 ohm driving circuit 26, the 5 ohm $H_{RF}$ generator 6 and the 5 ohm terminator, under the same RF signal as that inputted into the 50 ohm system.

In Embodiments 1 through 5, the waveguide was used in the magneto-optic device 1. However, a bulk magneto-optic device can be of course employed.

Further, in Embodiments 1 through 5, at least the analyzer was employed in the magneto-optic modulator, the polarizer and analyzer are not required, if an intefrerometer is used.

Embodiment 6

FIGS. 10A, 10B, 10C, 10D and 10E show the magneto-optic device including a magnetic core of Embodiment 6.

The magnetic core is utilized in general in a lower frequency range, because there is not a magnetic core suitable for a higher frequency range, i.e., over 100 MHz, or 1 GHz (J. Smith et al. "Ferrites", Cleaver-Hume Press, pp269–300, 1959).

However, it was proved to be possible to raise the modulation depth by utilizing the ferrite magnetic core in order to effectively generate the RF magnetic field.

Figure 10A:
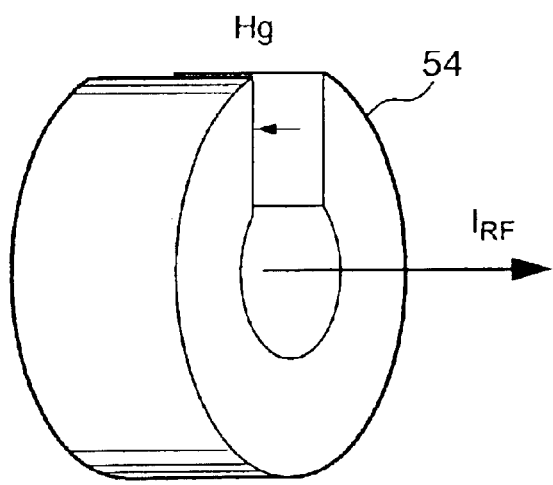
FIGS. 10A, 10B, 10C, 10D and 10E shows the magneto-optic modulator of Embodiment 6.

FIG. 10A shows a magnetic field direction in a gap Hg in the magnetic core and a direction of the RF electric current $I_{RF}$ which generates the RF magnetic field $H_{RF}$. The magneto-optic material is magnetically saturated to Ms toward Hbi direction.

Figure 10B:
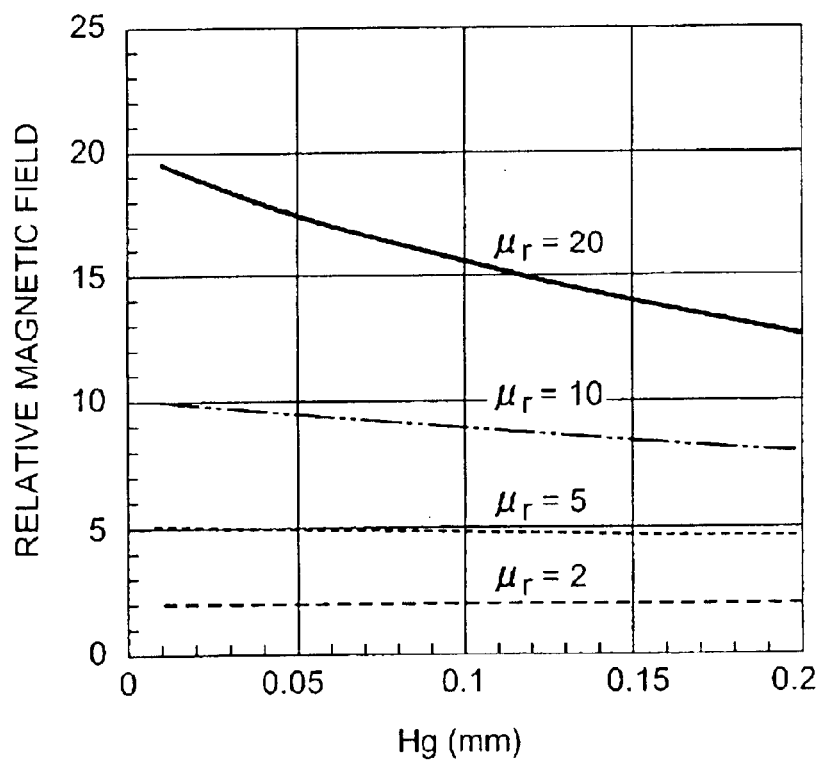

FIG. 10B is a graph showing relative magnetic fields, i.e., the ratios of the magnetic field raised by the magnetic core to the coreless magnetic field generated by $I_{RF}$. The ratios become between twofold and twentyfold, depending upon Hg and a relative magnetic permeability $\mu_r$.

Figure 10C:
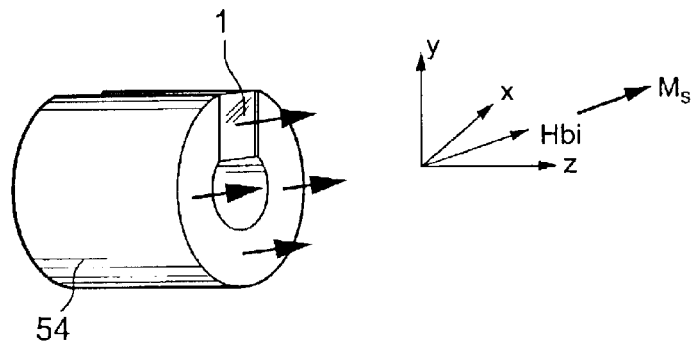
Figure 10D:
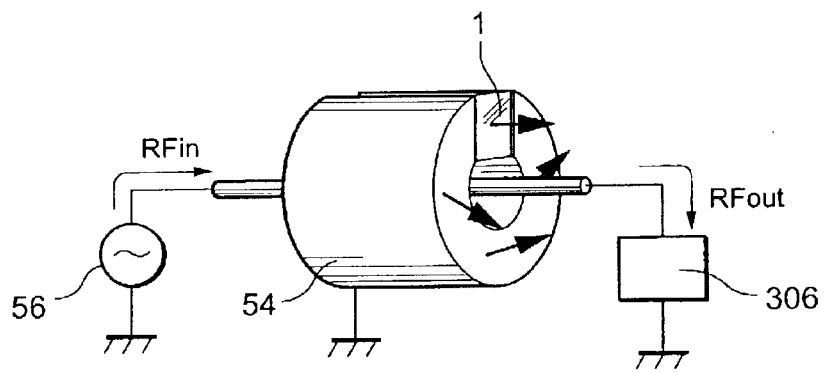
Figure 10E:
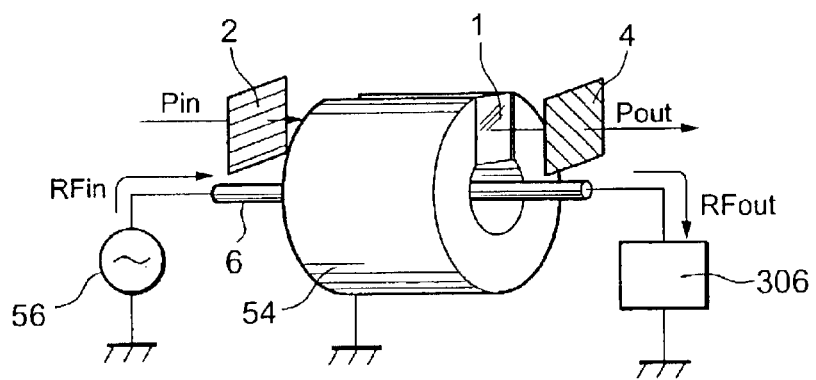

FIGS. 10C, 10D and 10E shows an operational principle of the magneto-optic device 1 including the magnetic core 54.

As shown in FIG. 10C, the magneto-optic device is inserted into the gap of the magnetic core 54. The bias magnetic field Hbi is directed to 45° from the Z axis in the XZ plane. The magneto-optic device 1 and magnetic core 54 are magnetized to their saturation magnetizations along the Hbi direction.

Next, as shown in FIG. 10D, a conductive line 6. i.e., the RF magnetic field generator 6 passes through the magnetic core 54 of which outer circumference is electrically grounded, thereby constructing a coaxial transmission line. Therefore, when the characteristic impedance of the above-mentioned coaxial transmission line is matched with those of the RF signal generator 56 and the impedance adjuster 306, the magneto-optic modulator operates in a wider frequency range. The RF magnetic field generator 6 generates a clockwise magnetic field from the RF signal generator toward the impedance adjuster 306. Therefore, the saturation magnetization Ms of the magneto-optic device 1 is rotated from the Hbi direction by the clockwise magnetic field, thereby making the permeability of the magnetic core 54 greater than 1. Thus, the magnetic core 54 raises the magnetic filed in the gap Hg, in spite of the saturation by the Hbi.

FIG. 10E shows the magneto-optic modulator including the magnetic core 54. It should be understood that the magneto-optic device 1 is not limited to the waveguide, but may be made of a bulk material such as a $(BiGd)_3Fe_5O_{12}$ crystal thick film grown by flux method, or in general Bi-substituted rare-earth iron garnet $(BiR)_3(FeGa)_5O_{12})$ (Here, R is a rare earth element) grown by liquid phase epitaxy on a (111)-oriented non-magnetic garnet substrate such as $Gd_3Ga_5O_{12}$. Further, the nonmagnetic garnet substrate is removed by, e.g., polishing, in order to avoid reducing the effective permeability of the magnetic garnet. The easy axis of magnetization of the thick film of Bi-substituted rare-earth iron garnet is <111> which is directed to the X direction, i.e., the RF magnetic field direction, thereby raising the modulation depth. Further, Ni—Zn ferrite, sintered Ni—Zn ferrite, or garnet ferrite may be preferably employed for the magnetic core 54.

According to the magneto-optic device 1 including the magnetic core 54, the modulation depth becomes between twofold and fivefold.

Embodiment 7

Figure 11:
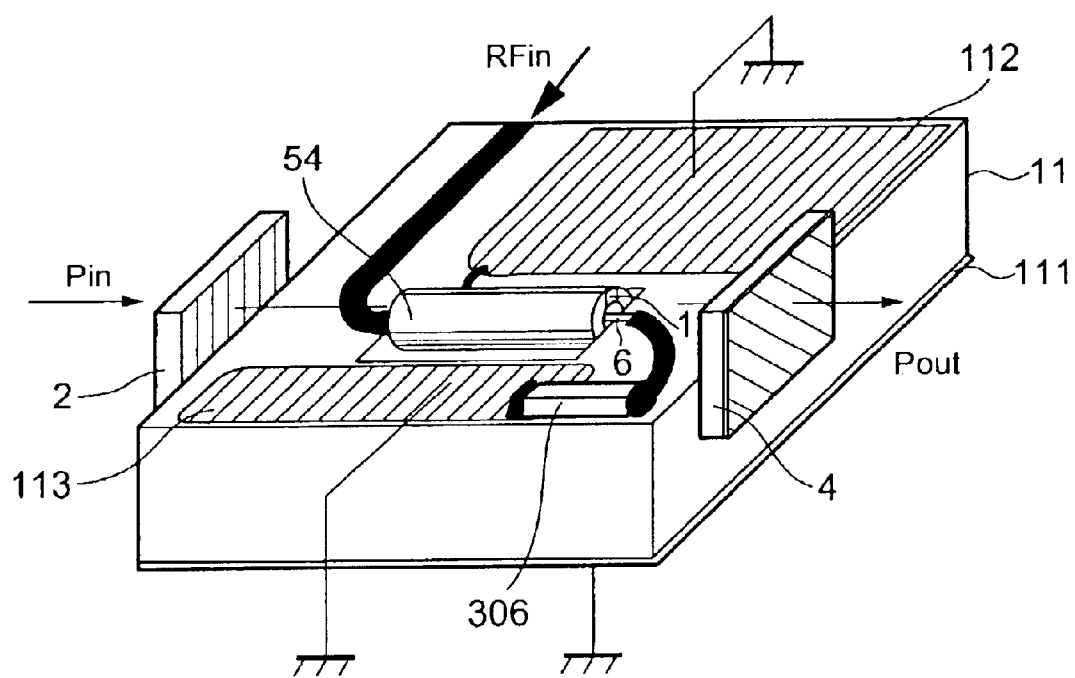
FIG. 11 is a perspective view of the magneto-optic modulator of Embodiment 7.

FIG. 11 is a perspective view of a main part of the magneto-optic device 1 including the magnetic core 54 of Embodiment 7. The bias magnetic field generator is not shown. The magneto-optic device 1 is mounted on the insulating substrate 11 such as alumina, or resin such as glass epoxy or teflon. The RF characteristics of the alumina substrate is better than that of the resin substrate. The magneto-optic device 1 and the magnetic core 54 is the same as that of Embodiment 6. Further, the outer circumference of the magnetic core 54 is covered with an electrode which is electrically grounded by the electrode 112. Further, the electrodes 11, 112 and 113 are electrically grounded, in accordance with the strip line structure or coaxial line structure. Further, the magnetic core 54 having the magneto optic device 1 is buried in the alumina substrate 11 wherein a hole is formed in order to receive the magnetic core 54 and the magneto-optic device 1. Further, the impedance adjuster 306, i.e., the terminating resister is mounted on the insulating substrate 11. According to the above-mentioned structure, the magneto-optic modulator was made compact-sized.

Embodiment 8

Figure 12:
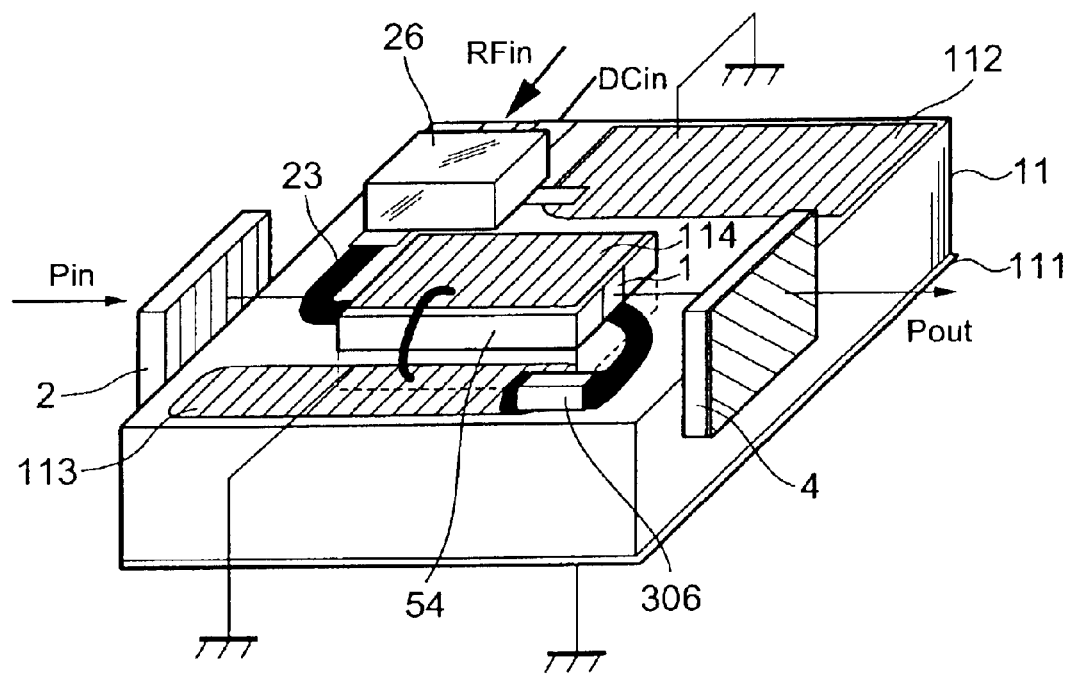
FIG. 12 shows the magneto-optic device of Embodiment 8.

FIG. 12 is a perspective view of a main part of the magneto-optic modulator of Embodiment 8, wherein there are integrated on the insulating substrate 11, the magneto-optic device 1, the magnetic core 54 connected electrically with the electrode 112, the driving circuit 26 as a part of the impedance transformer, the RF magnetic field generator 6 and the terminator as the impedance adjuster 306. Further, the electrode 114 is connected electrically with the electrode 113, and the electrodes 111,112,113 are electrically grounded, in accordance with the strip line structure. The bias magnetic field generator is not shown. The magnetic field arrangement may be (0°, 90°) as shown in FIG. 1B, or (45°, 90°) as shown in FIG. 2B.

As shown in FIG. 12, the RF magnetic field generator 6, i.e., the strip line 23 is completely surrounded by the magnetic core 54 and the magneto-optic device 1. Concretely, on the lower magnetic core 54 buried in the substrate 11b, the upper magnetic core 54 including the magneto-optic device 1 is mounted, thereby holding the strip line 23. Therefore, the magnetic circuit including the magnetic core 54 and the magneto-optic device 1 is almost closed. Further, the bulk magneto-optic material can be employed in Embodiment 8.

In an experiment, the characteristic impedance of the RF magnetic field generator 6 (strip line 23) and impedance adjuster 306 (terminator) was 10 ohms, while a voltage of, e.g., +3 or +5 V was supplied from a voltage supply to the driving circuit 26. The modulation depth or modulated signal amplitude became between twentyfold and fiftyfold, compared with Embodiment 2.

Thus, the compact magneto-optic modulator of Embodiment 8 is realized by the integration of main parts on the insulating substrate 11 and it achieves a high performance modulation.

Embodiment 9

Figure 13:
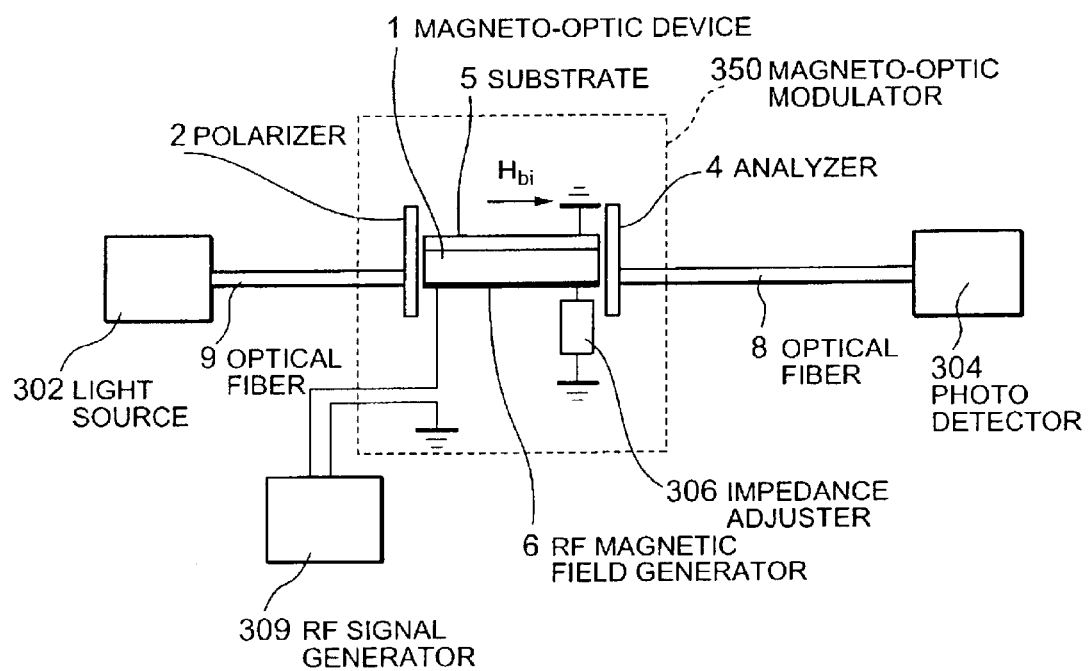
FIG. 13 is a block diagram of the optical communication system of Embodiment 9.

FIG. 13 is a block diagram of an optical communication system of the present invention, using the magneto-optic modulator of Embodiment 1 as shown in FIG. 5.

The light from the light source 302 is introduced, through the optical fiber 9, into the magneto-optic modulator 350, thereby outputting the modulated component through the analyzer 4.

Here, the polarizer 2 may be omitted, if the light source 302 is a semiconductor laser and the optical fiber 9 is a polarization maintaining fiber.

The light from the light source 302 transmits through the polarizer 2 and then its polarization is rotated at the magneto-optic device 1 in accordance with the RF magnetic field propagating on the strip line as the RF field generator. It is necessary for a wider frequency range of modulation to match the impedance of the RF signal generator with a characteristic impedance of the strip line and an electric terminator 306.

The analyzer 4 transmits only a component corresponding its transmittance direction, thereby transmitting the component corresponding to Faraday rotation.

The light through the analyzer 4 transmits through the optical fiber 8 and is introduced into the light detector 304, thereby converting a light signal to an electric signal which is then demodulated by a not-shown amplifier and signal processor.

The modulation frequency was about 10 GHz in the optical communication system of Embodiment 9. The transmission distance of Embodiment 9 utilizing the external modulation is made longer than systems utilizing the direct modulation of the light source 302 such as the semiconductor laser wherein the transmitted signal is degraded by the group veloccity delay caused by the wavelength chirping.

Further, the magneto-optic modulator of Embodiments 2 through 8 could be used in this communication system.

Embodiment 10

Figure 14:
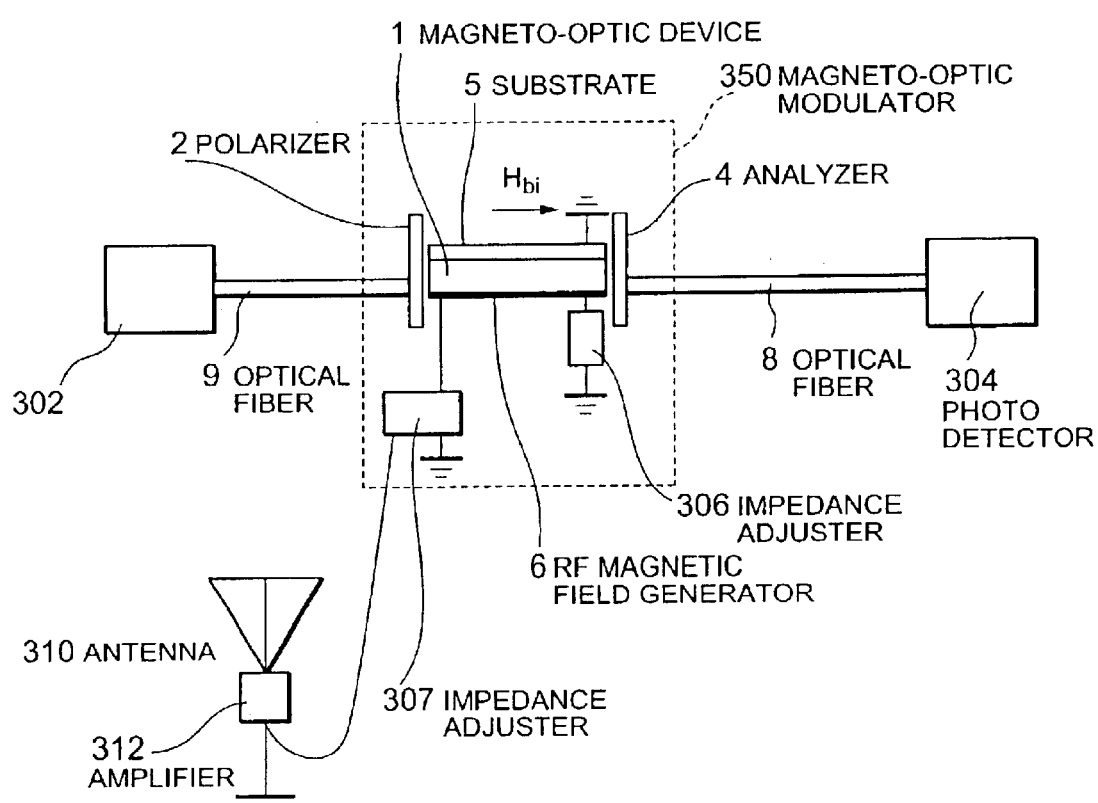
FIG. 14 is a block diagram of the optical communication system of Embodiment 10.

FIG. 14 is a block diagram of the optical communication system of Embodiment 10, wherein an antenna 310 is used for introducing the RF signal into the magneto-optic modulator 352 through the amplifier 312.

The RF signal is utilized for generating the RF magnetic field in the RF magnetic field generator such as the strip line and terminated at the end of the strip line.

In general, the bandwidth of the antenna signal is narrow in spite of high transmission frequency. Therefore, only a desired frequency may be picked up by a filter function of the impedance adjuster 307 and the terminator 308.

In an experiment, an RF signal with central frequency 2.4 GHz and bandwidth 100 MHz was transmitted through the optical fiber 8 at a 5 km distance.

In the above-described system, if the antenna output is sufficient, the amplifier 312 may be omitted.

Further, if the linearity is required, the magneto-optic modulator as shown in Embodiment 3 may be employed.

In the light modulator in Embodiment 10 used outdoors, there were not measured such disadvantages as the DC drift of the electro-optic modulator, or a degradation of transmitted signals due to a temperature variation.

Further, the magneto-optic modulator of Embodiments 2, and 4–8 could be used in this optical communication system.

What is claimed is:

1. A magneto-optic modulator comprising:
   a magneto-optic device for rotating a polarization of an incident light;
   a bias magnetic field generator for generating a bias magnetic field;

an RF magnetic field generator for generating an RF magnetic field; and an impedance adjuster for adjusting an impedance of said RF magnetic field generator, wherein said RF magnetic field has a component perpendicular to a light propagation direction; and said RF magnetic field is directed to more than ±30° from said bias magnetic field direction.

2. The magneto-optic modulator according to claim 1, wherein said bias magnetic field is directed to said light propagation direction, while said RF magnetic field is directed to 90° from said light propagation direction.

3. The magneto-optic modulator according to claim 1, wherein said bias magnetic field is directed to 45° from said light propagation direction, while said RF magnetic field is directed to 90° from said light propagation direction.

4. The magneto-optic modulator according to claim 1, wherein said bias magnetic field is directed to 45° from said light propagation direction, while said RF magnetic field is directed to 135° from said light propagation direction.

5. The magneto-optic modulator according to claim 1, wherein said bias magnetic field is a DC magnetic field.

6. The magneto-optic modulator according to claim 1, wherein said bias magnetic field is greater than a saturation magnetic field of said magneto-optic device which is of a multi-domain structure under a zero bias field.

7. The magneto-optic modulator according to claim 1, wherein said magneto-optic device is made of Bi-substituted garnet.

8. The magneto-optic modulator according to claim 7, wherein said Bi-substituted garnet is grown by liquid phase epitaxy on a non-magnetic garnet substrate.

9. The magneto-optic modulator according to claim 1, which further comprises a magnetic core for receiving said magneto-optic device in its gap, wherein: said RF magnetic field generator passes through said magnetic core; and a specific permeability of said magnetic core is greater than one.

10. The magneto-optic modulator according to claim 9, wherein a magnetic circuit including said magnetic core and said magneto-optic device is substantially closed.

11. The magneto-optic modulator according to claim 1, wherein said RF magnetic field generator is a distributed constant line.

12. The magneto-optic modulator according to claim 11, wherein said distributed constant line is a strip line, coplanar line, or coaxial line.

13. The magneto-optic modulator according to claim 11, wherein a characteristic impedance of said distributed constant line is greater than or equal to 5 ohms and smaller than or equal to 45 ohms.

14. The magneto-optic modulator according to claim 1, wherein said impedance adjuster comprises:

a transmission transformer for adjusting an impedance of said RF magnetic field generator; and a terminator for terminating said RF signal.

15. The magneto-optic modulator according to claim 1, wherein said impedance adjuster comprises:

a driving circuit for amplifying a current of said RF signal; and a terminator for terminating said RF signal.

16. The magneto-optic modulator according to claim 1, wherein a frequency of said RF signal is smaller than a ferromagnetic resonance frequency of said magneto-optic device.

17. The magneto-optic modulator according to claim 1, which further comprises an analyzer disposed at an output side of said magneto-optic device.

18. The magneto-optic modulator according to claim 17, wherein a polarization axis of said analyzer is directed at such a direction that substantially a half intensity of a light of which polarization is rotated through said magneto-optic device and outputted from said magneto-optic device is transmitted.

19. The magneto-optic modulator according to claim 1, wherein a polarizer is disposed at an incident side of said magneto-optic device.

20. An optical communication system comprising:

a magneto-optic modulator which comprises: a magneto-optic device for rotating a polarization of an incident light; a bias magnetic field generator for generating a bias magnetic field; an RF magnetic field generator for generating an RF magnetic field; and an impedance adjuster for adjusting an impedance of said RF magnetic field generator, wherein said RF magnetic field has a component perpendicular to a light propagation direction; and said RF magnetic field is directed to more than ±30° from said bias magnetic field direction;

an RF signal generator for generating an RF signal inputted into said RF magnetic field generator;

a light source for inputting a light into said magneto-optic modulator;

a photo detector for detecting said light modulated by said magneto-optic modulator; and optical fibers from said light source to said magneto-optic modulator and from said magneto-optic modulator to said photo detector.

21. The optical communication system according to claim 20, wherein said bias magnetic field is directed to said light propagation direction, while said RF magnetic field is directed to 90° from said light propagation direction.

22. The optical communication system according to claim 20, wherein said bias magnetic field is directed to 45° from said light propagation direction, while said RF magnetic field is directed to 90° from said light propagation direction.

23. The optical communication system according to claim 20, wherein said bias magnetic field is directed to 45° from said light propagation direction, while said RF magnetic field is directed to 135° from said light propagation direction.

24. The optical communication system according to claim 20, wherein said bias magnetic field is a DC magnetic field.

25. The optical communication system according to claim 20, wherein said bias magnetic field is greater than a saturation magnetic field of said magneto-optic device which is of a multi-domain structure under a zero bias field.

26. The optical communication system according to claim 20, wherein said magneto-optic device is made of Bi-substituted garnet.

27. The optical communication system according to claim 26, wherein said Bi-substituted garnet is grown by liquid phase epitaxy on a non-magnetic garnet substrate.

28. The optical communication system according to claim 20, which further comprises a magnetic core for receiving said magneto-optic device in its gap, wherein: said RF magnetic field generator passes through said magnetic core; and a specific permeability of said magnetic core is greater than one.

29. The optical communication system according to claim 28, wherein a magnetic circuit including said magnetic core and said magneto-optic device is substantially closed.

30. The optical communication system according to claim 20, wherein said RF magnetic field generator is a distributed constant line.

31. The optical communication system according to claim 30, wherein said distributed constant line is a strip line, coplanar line, or coaxial line.

32. The optical communication system according to 30, wherein a characteristic impedance of said distributed constant line is greater than or equal to 5 ohms and smaller than or equal to 45 ohms.

33. The optical communication system according to claim 20, wherein said impedance adjuster comprises:
   a transmission transformer for adjusting an impedance of said RF magnetic field generator; and
   a terminator for terminating said RF signal.

34. The optical communication system according to claim 20, wherein said impedance adjuster comprises:
   a driving circuit for amplifying a current of said RF signal; and
   a terminator for terminating said RF signal.

35. The optical communication system according to claim 20, wherein a frequency of said RF signal is smaller than a ferromagnetic resonance frequency of said magneto-optic device.

36. The optical communication system according to claim 20, which further comprises an antenna for outputting said RF signal fed to said RF magnetic field generator.

37. The optical communication system according to claim 20, wherein at least one optical fiber is a polarization maintaining fiber.

38. The optical communication system according to claim 20, which further comprises an analyzer disposed at an output side of said magneto-optic device.

39. The optical communication system according to claim 38, wherein said analyzer transmits substantially a half intensity of a light of which polarization is rotated through said magneto-optic device and outputted from said magneto-optic device is transmitted.

40. The optical communication system according to claim 20, wherein a polarizer is disposed at an incident side of said magneto-optic device.

* * * * *